March 11, 1924.

A. B. ALDRICH

LICENSE TAG FASTENER

Filed May 25, 1923

1,486,719

Inventor
A. Bennett Aldrich
By
Attorney

Patented Mar. 11, 1924.

1,486,719

UNITED STATES PATENT OFFICE.

ANTHONY BENNETT ALDRICH, OF WASHINGTON, DISTRICT OF COLUMBIA.

LICENSE-TAG FASTENER.

Application filed May 25, 1923. Serial No. 641,447.

*To all whom it may concern:*

Be it known that ANTHONY BENNETT ALDRICH, citizen of the United States, residing at Washington, in the District of Columbia, has invented certain new and useful Improvements in License-Tag Fasteners, of which the following is a specification.

This invention relates to screw fastenings, and has special reference to a screw fastening particularly adapted to hold what are commonly called "license plates or number tags" for vehicles on the bracket usually provided for the support of such plates or tags. The invention thus is a screw fastening for license plates.

The ordinary form of screw fastening for this purpose is usually such as to acquire the use of a tool of some sort, either to hold one part stationary while the other is being rotated, as is the case where the thumb nut and machine screw or bolt are employed, or to hold one part while the other part is being rotated, as is the case where stove bolts or ordinary bolts and nuts are used.

One important object of the present invention is to provide a novel and improved form of fastening which may be very quickly applied without the use of any tools whatever, both parts of the fastening being provided with finger grips.

It is a well recognized fact, among all users of automobiles, that whenever it is necessary to change or replace number tags or license plates, it is commonly a matter of very considerable difficulty owing to the fact that the ordinary screw fastenings used have the screw threads projecting beyond the nut used therewith, and these threads and the nut itself become so rusted that it is difficult to unscrew the fastening, and in some instances, the nut and bolt are so cemented together by the rust, that it is impossible to remove them in the ordinary way and they must be cut or broken off.

A second important object of the invention is to provide an improved and novel two-part screw fastening for this purpose wherein the parts may readily be assembled without the use of tools of any character, and wherein provision is made for fully protecting the threaded portions from the action of the weather tending to rust the same.

With the above and other objects in view, as will be hereinafter apparent, the invention consists in general of certain novel details of construction and combinations of parts hereinafter more fully described, illustrated in the accompanying drawings, and specifically claimed.

In the accompanying drawings like characters of reference indicate like parts in the several views, and:

Figure 1:
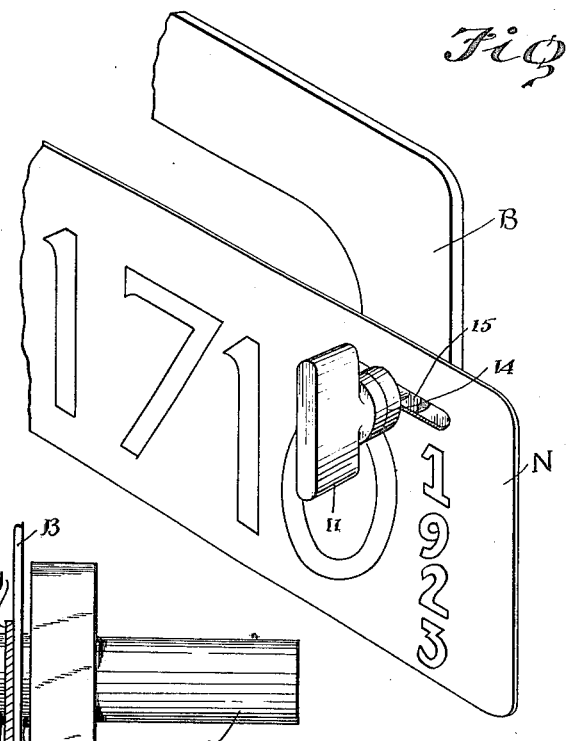
Fig. 1 is a view of a corner of the number tag or plate and portion of a bracket showing the device in use thereon.

In carrying out the objects of this invention, there is provided a pair of co-operating members. One of these members has an externally threaded shank 10, and is provided at one end with a finger grip 11. The other of these members consists of an internally threaded socket having a cylindrical body 12 adapted to receive the threaded shank 10, this socket being closed at one end, and provided on the opposite end with a finger grip 13.

It is to be observed that these two finger grips may be of any size, character, shape or form desired or found convenient, and can be either plain, as shown in the drawings, or as highly ornamented as may be found desirable in the sales of the device.

Figure 2:
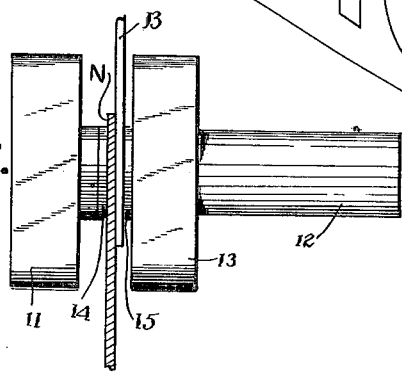
Fig. 2 is a view of the device with the parts assembled, the view being to a very greatly enlarged scale, and disclosing the manner in which the number plate and bracket are clamped together.
Figure 3:
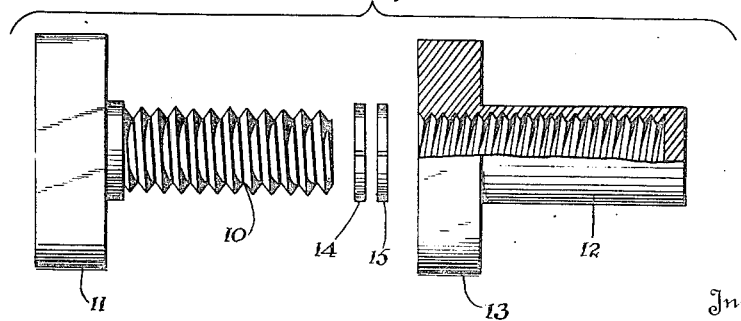
Fig. 3 is an exploded view of the other parts of the screw fastening used herewith.

The manner of utilizing the device may be seen by reference to Figures 1 and 2, wherein B represents the uusal bracket for an automobile or the like, and N the usual number or license plate. It will be seen that the shank 10 of the first member is passed through registering openings in the bracket and number plate, a locking washer 14 being disposed on this shank under the head 11. This part of the device is preferably inserted from the front of the number plate to the rear thereof, and projects rearwardly behind the number plate and bracket so that the remaining part of the device may be screwed thereon after a second locking washer 15 has been placed in position. Thus, it will be seen that the two finger grips form cooperating heads which serve to clamp the two locking washers and the number plate and bracket firmly together, and thus prevent rattling.

It will be obvious that by raising of the finger grips on the two elements, these may be readily applied without the use of tools, and by raising of the closed socket construction of the nut member, the entire length of the screw threading which projects rearwardly of the number plate is protected from the weather, and thus cannot accumulate any rust, nor have its threads injured by accidental blows.

There has thus been provided a very simple and efficient device of the kind described and for the purpose specified.

Having thus described the invention, what is claimed as new, is:

A fastening comprising a screw threaded member having a transversely elongated head arranged for gripping between the fingers, and a cooperating internally threaded socket member closed at one end and having a transversely elongated enlarged finger grip at its other end.

In testimony whereof I affix my signature.

ANTHONY BENNETT ALDRICH.